United States Patent
Ranganathan et al.

(10) Patent No.: US 12,117,890 B2
(45) Date of Patent: Oct. 15, 2024

(54) DYNAMICALLY CREATING A CONTACT ADDRESS TO CUSTOMER SUPPORT BASED ON INFORMATION ASSOCIATED WITH A COMPUTING DEVICE

(71) Applicant: Dell Products L. P., Round Rock, TX (US)

(72) Inventors: Karthik Ranganathan, Round Rock, TX (US); Vasudev Ka, Karnataka (IN); Sathish Kumar Bikumala, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 741 days.

(21) Appl. No.: 16/932,986

(22) Filed: Jul. 20, 2020

(65) Prior Publication Data
US 2022/0019498 A1    Jan. 20, 2022

(51) Int. Cl.
| G06F 11/07 | (2006.01) |
| G06F 8/65 | (2018.01) |
| G06N 5/04 | (2023.01) |
| G06N 20/00 | (2019.01) |
| G06Q 10/0631 | (2023.01) |
| G06Q 10/107 | (2023.01) |
| G06Q 30/016 | (2023.01) |
| H04M 3/51 | (2006.01) |
| H04M 3/523 | (2006.01) |

(52) U.S. Cl.
CPC ............ *G06F 11/0778* (2013.01); *G06F 8/65* (2013.01); *G06F 11/0709* (2013.01); *G06F 11/0751* (2013.01); *G06N 5/04* (2013.01); *G06N 20/00* (2019.01); *G06Q 10/063112* (2013.01); *G06Q 10/107* (2013.01); *G06Q 30/016* (2013.01); *H04M 3/5191* (2013.01); *H04M 3/5233* (2013.01)

(58) Field of Classification Search
CPC ....... G06N 20/00; G06F 8/65; G06F 11/0709; G06F 11/07; G06F 11/0778
See application file for complete search history.

(56) References Cited

U.S. PATENT DOCUMENTS

| 9,479,491 | B1* | 10/2016 | Farnsworth | ............ G06F 21/42 |
| 2016/0050320 | A1* | 2/2016 | Montenegro | ......... H04M 7/003 |
| | | | | 379/265.09 |

(Continued)

*Primary Examiner* — Rasha S Al Aubaidi
(74) *Attorney, Agent, or Firm* — Krishnendu Gupta; Deepika Bhayana; Lesley A. Leonessa

(57) ABSTRACT

In some examples, a computing device may determine that an issue (e.g., crash, restart etc.) occurred, gather context data (e.g., logs, device profile, etc.) associated with the issue, and generate a contact address to technical support based on the context data. The computing device may upload the context data to a location accessible to a server. After a user of the computing device initiates a communication to technical support using the contact address, the server may automatically route the call, based on the contact address, to a particular technician that has experience addressing the issue. The server may retrieve the context data and use machine learning to determine recommendations to address the issue. The machine learning may prioritize the recommendations and provide the context data and the prioritized recommendations to enable the particular technician to quickly resolve the issue.

11 Claims, 7 Drawing Sheets

(56) References Cited

U.S. PATENT DOCUMENTS

2018/0321997 A1* 11/2018 Palla .................... G06F 11/0775
2019/0027018 A1* 1/2019 Corpus ................ G08B 29/185
2021/0374675 A1* 12/2021 George .................. G06F 11/30

* cited by examiner

DYNAMICALLY CREATING A CONTACT ADDRESS TO CUSTOMER SUPPORT BASED ON INFORMATION ASSOCIATED WITH A COMPUTING DEVICE

BACKGROUND OF THE INVENTION

Field of the Invention

This invention relates generally to computing devices and, more particularly to generating a phone number to contact technical support in response to determining that a computing device has an issue that is addressable by technical support. The phone number may be generated based on a context associated with the computing device including the issue associated with the computing device. The phone number may route a call initiated by a user to an appropriate technical support specialist, without asking the user to enter information associated with the context.

Description of the Related Art

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When a computer manufacturer (e.g., Dell®) sells a hardware product (e.g., computing device), the product may come with a warranty. For example, the manufacturer may warranty that the product will be free from defects in materials and workmanship for a specified period of time (e.g., 2 years), starting from the date of invoice. In addition, the manufacturer may offer, for an additional fee, additional services, such as, for example, Accidental Damage Service, Hardware Service Agreement (e.g., remote diagnosis of issues, pay only for parts if product is serviced, exchange for same or better product if product cannot be fixed), Premium Support services, and the like.

When a user of the computing device encounters an issue (e.g., hardware issue, software issue, or both), then the user may initiate a call to technical support associated with the manufacturer. If the user places a call, the user may be placed in an interactive voice response (IVR) system that gathers information about the issue based on voice responses, e.g., the IVR system may ask various questions and, based on the user's answers, route the call to an appropriate technical support specialist. For example, if the IVR system determines that the issue is related to X (e.g., operating system, application, driver, or the like) of the computing device, then the IVR system may route the call to a technical support specialist experienced in diagnosing X (e.g., operating system, application, driver, or the like) issues. If the user initiates a chat, the user may chat with a software agent ("chat bot") that asks the user various questions before routing the user to an appropriate technical support specialist. However, obtaining issue-related information from a user may be a lengthy process and may cause the user frustration due to the length of the process.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may determine that an issue (e.g., crash or restart of an operating system, application, driver or the like) occurred, gather context data (e.g., logs, device profile, and the like) associated with the issue, and generate a contact address to technical support based on the context data. The computing device may upload the context data to a location accessible to a server. After a user of the computing device initiates a communication to technical support using the contact address, the server may automatically route the call, based on the contact address, to a particular technician that has experience addressing the issue. The server may retrieve the context data and use machine learning to determine recommendations (e.g., rollback recently installed software, install a software update, or the like) to address the issue. The machine learning may prioritize the recommendations and provide the context data and the prioritized recommendations to enable the particular technician to quickly resolve the issue.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
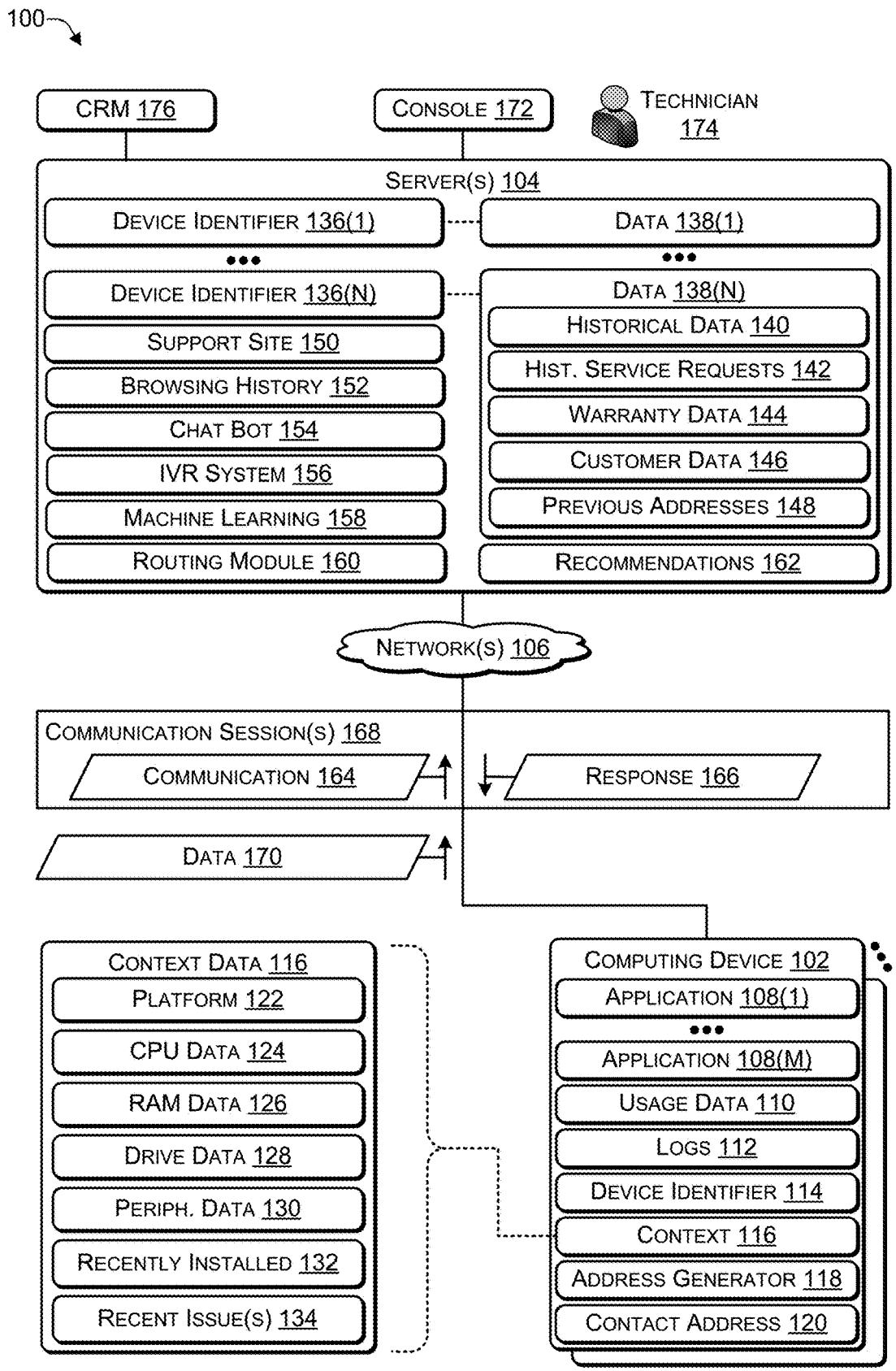
FIG. 1 is a block diagram of a system that includes dynamically generating a contact number for technical support, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

A computer manufacturer, such as, for example, Dell®, may provide service technicians to resolve issues related to devices sold by the computer manufacturer. For example, after a user has purchased a computing device, the user may encounter an issue, such as a hardware issue, a software issue, or both. To resolve the issue, the user may contact (e.g., via email, chat, or a call), a technical support department of the manufacturer. In a conventional system, the user may initiate a communication (e.g., a call or a chat) to a technical support address printed in an owner's manual, or other location. In the conventional system, an interactive voice response (IVR) system or an automated software agent ("chat bot") may ask the user various questions about the issue, such as what type of device (e.g., tablet, laptop, desktop, server, or the like) is having the issue, how the issue manifests (e.g., keyboard is nonresponsive, multiple restarts, application crashes, or the like), and other question. Based on the answers received from the user, the IVR system or the chat bot may route the user to an appropriate support specialist (e.g., appropriate means someone who specializes in resolving issues similar to the user's issue). The systems and techniques described herein enable a computing device to gather context information and issue-related information and dynamically generate a contact address, such as a dynamically generated phone number or dynamically generated web address or email address, to enable the user to contact technical support. Rather than being routed to an IVR system or a chat bot, the dynamically generated contact address may directly route the user-initiated communication (e.g., call or chat) to the appropriate technical support specialist.

For example, when an issue occurs that is sufficient (e.g., application crash, operating system (OS) crash, blue screen of death (BSOD), hard disk crash, or the like) to warrant contacting customer support, the systems and techniques may gather context data, such as, for example, a type of platform (e.g., tablet, laptop, desktop, consumer, business, gaming, or the like) associated with the computing device, CPU data associated with a central processing unit (CPU) of the computing device, random-access memory (RAM) data associated with a memory of the computing device, drive data associated with one or more storage devices of the computing device, peripheral data associated with one or more peripherals connected to the computing device, one or more recent issues (e.g., application crash, OS crash, BSOD, or the like) associated with the computing device, including logs associated with the recent issues, additional contextual information, or any combination thereof. The systems and techniques may use the context data to dynamically generate a contact address, such as a contact number (e.g., to call), a contact web address (e.g., to chat), a contact email address (e.g., to email), or the like. The user may use the contact address to contact technical support provided by a manufacturer of the computing device. The contact address that was dynamically generated may route the user directly to a customer service technician that is suited (e.g., has the training and/or experience) to address the issue. As used herein, the term "log" refers to a file that contains information about one or more events that have occurred within a software application (including an operating system or a driver). The events are logged by the application and written to the file and may include errors, warnings, and information. The software application may create a log when the software application encounters an unexpected condition (e.g., memory cannot be allocated, insufficient storage space to write a file, corrupted file that cannot be accessed or the file contents cannot be read, another software application is not responding to a request, and the like).

The manufacturer may provide a server that is used to access technical support using the dynamically generated contact address. When the server receives a communication initiated through a dynamically generated contact address, the server may analyze the contact address to determine the context of the issue (e.g., laptop, desktop, consumer, business, enterprise, operating system, application, and the like) and use machine learning to identify an appropriate service technician that has skills, education, and experience with the issue (or similar issues) and route the communication to the appropriate service technician. In this way, the user is not asked to answer multiple IVR (or chat bot) questions.

In addition to generating the contact address, the systems and techniques may automatically upload the context data to the server associated with the manufacturer or a cloud-based customer relationship manager (CRM). After the server receives the communication and routes the communication to the appropriate service technician, the server may identify the uploaded context data and provide the context data to the service technician to which the communication has been routed. In this way, the service technician can view the context data as the user is being placed in communication with the service technician, thereby enabling the service technician to immediately begin troubleshooting the issue. In some cases, machine learning may be used to identify and prioritize a set of possible solutions to address the issue and the prioritize set of possible solutions may be presented to the service technician along with the context data. For example, the service technician, after being connected to the user, may say "I see that you are encountering issue Y. I recommend that we first try Z (e.g., updating a particular driver>. If that does not address the issue, then the other possible cause of the issue is X (e.g., faulty RAM), in which case a technician will come out to replace the faulty RAM with new RAM." Thus, the service technician is presented not only with context data associated with an issue but also a prioritized set of possible solutions to the issue, enabling the service technician to quickly and efficiently address the issue. Doing so may improve customer satisfaction and improve the efficiency of each service technician.

In some examples, a computing device may include one or more processors and one or more non-transitory computer readable media storing instructions executable by the one or more processors to perform various operations. The operations may, for example, include determining that an issue has occurred on the computing device. For example, the issue may include at least one of: (i) a failure to boot an operating system of the computing device, (ii) an involuntary (e.g., operating system rather than user initiated) shutdown of the operating system, (iii) an involuntary (e.g., operating system rather than user initiated) reboot of the operating system, (iv) an inability to execute a software application (e.g., application crashes or cannot be started), or (v) an inability to execute a driver. The operations may include determining context data associated with the issue. For example, the context data may include (i) one or more logs generated by a component of the computing device and (ii) platform data identifying a type of platform associated with the computing device. In some cases, the context data may include at least one of: (i) CPU data associated with a central processing unit (CPU) of the computing device, (ii) RAM data associated with a random-access memory (RAM) of the computing device, (iii) drive data associated with a storage drive of the computing device, or (iv) peripheral data associated with a peripheral device that is connected to the computing device. In some cases, the context data may include recently installed data associated with a component of the computing device that was installed within a predetermined time interval (e.g., within T minutes, T>0) from a current time. For example, the component of the computing device may include at least one of: (i) an operating system or an update to the operating system, (ii) a software application or an update to the software application, (iii) a driver, (iv) a firmware of a hardware component, or (v) a basic input/output system (BIOS) of the computing device. The operations may include determining that the issue has not previously occurred on the computing device. The operations may include generating, based at least in part on the context data, a contact address to contact technical support. The contact address may be one of: a telephone number to initiate a telephone communication, a video link to initiate a video communication (e.g., using Skype®, Zoom®, Facetime®, or the like), an audio link to initiate an audio communication (e.g., voice over internet protocol (VoIP) call), a chat link to initiate a chat communication (e.g., using Zendesk or another chat app), or an email address to initiate an email communication. For example, a communication initiated using the contact address may cause the communication to be automatically routed to a support technician having experience with the issue on the type of platform associated with the computing device. In some cases, the contact address may include at least one of: a first portion that identifies the platform, a second portion that identifies the issue, a third portion that identifies a type of technical support specialist, or a fourth portion that identifies a particular technical support specialist. For example, when the contact address comprises a phone number, in the last 4 digits of the phone number, one of the digits may identify the platform, another of the digits may identify the issue, a different digit may identify a type of technical support specialist, and yet another digit may identify a particular technical support specialist. It should be understood that the order of the digits may vary. For example, the last of the 4 digits may identify either the platform, the issue, the type of support, or the particular support specialist, and so on.

A server may include one or more processors and one or more non-transitory computer-readable storage media to store instructions executable by the one or more processors to perform various operations. For example, the operations may include receiving a communication to a contact address associated with a technical support group. For example, the contact address may be one of: (i) a telephone number to initiate a telephone communication, (ii) a video link to initiate a video communication (e.g., using Skype®, Zoom®, Facetime®, or the like), (iii) an audio link to initiate an audio communication (e.g., via VoIP), (iv) a chat link to initiate a chat communication (e.g., via Zendesk or another chat platform), or (v) an email address to initiate an email communication. The communication may be initiated in response to an issue occurring on a computing device. For example, the issue may include at least one of: (i) a failure to boot an operating system of the computing device, (ii) an involuntary shutdown of the operating system, (iii) an involuntary reboot of the operating system, (iv) an inability to execute a software application (e.g., application crashes or won't start executing), or (v) an inability to execute a driver. For example, the contact address may include at least one of: (i) a first portion that identifies the platform, (ii) a second portion that identifies the issue, (iii) a third portion that identifies a type of technical support specialist, or (iv) a fourth portion that identifies a particular technical support specialist. The operations may include automatically (e.g., without human interaction) routing, based on the contact address, the communication to a particular technician in the technical support group. For example, the particular technician may be experienced with addressing the issue occurring on the computing device. The operations may include automatically retrieving context data associated with the issue and providing the context data to the particular technician. The context data may be provided (e.g., sent to the server or uploaded to a cloud-based CRM) by the computing device. For example, the context data may include: (i) one or more logs generated by a component of the computing device and (ii) platform data identifying a type of platform associated with the computing device. In some cases, the context data may further include at least one of: (i) CPU data associated with a central processing unit (CPU) of the computing device, (ii) RAM data associated with a random-access memory (RAM) of the computing device, (iii) drive data associated with a storage drive of the computing device, or (iv) peripheral data associated with a peripheral device that is connected to the computing device. In some cases, the context data may also include recently installed data associated with a component of the computing device that was recently installed (e.g., installed within a predetermined time interval from a current time, such as with T hours, where T>0). For example, the component of the computing device may include at least one of: (i) an operating system or an update to the operating system, (ii) a software application or an update to the software application, (iii) a driver, (iv) a firmware of a hardware component of the computing device, or (v) a basic input/output system (BIOS). The operations may include determining, using a machine learning algorithm and based at least in part on the context data, one or more recommendations (e.g., rollback a recently installed update, install an additional update, or the like) to address the issue. The operations may include prioritizing, using the machine learning algorithm, the one or more recommendations according to a likelihood that each recommendation of the one or more recommendations will address the issue, to create prioritized recommendations and providing the prioritized recommendations to the particular technician.

FIG. 1 is a block diagram of a system 100 that includes dynamically generating a contact number for technical support, according to some embodiments. The system 100 may include multiple computing devices, such as a representative computing device 102, connected to one or more servers 104 via one or more networks 106.

The computing device 102 may include multiple software applications, such as an application 108(1) to an application 108(M) (M>0). The computing device 102 may monitor a usage of the applications 108 to determine usage data 110 identifying how often each of the applications 108 is being used, which computing resources (e.g., memory, storage, network bandwidth, and the like) of the computing device 102 each of the applications 108 are using, how frequently the computing resources are being used, and so on. The applications 108 may include an operating system (e.g., Linux, Windows®, or the like), device drivers, firmware of various hardware components (e.g., network interface card (NIC), storage device, basic input output system (BIOS), and the like), and other software components associated with the computing device 102. The computing device 102 may store one or more logs 112 generated by one or more of the applications 108. For example, the logs 112 may include installation logs generated when one or more of the applications 108 are installed, crash logs generated when one or more of the applications 108 crash, error logs when one or more of the applications 108 encounter an error, and other types of logs. The computing device 102 may include a device identifier 114 that uniquely identifies the computing device 102 from other computing devices. For example, the device identifier 114 may be a unique serial number, a unique service tag, a unique media access control (MAC) address, or other unique identifier.

When the computing device 102 determines that an issue has occurred sufficient to contact technical support, the computing device 102 may determine a context data 116 associated with the issue. In address generator 118 may use the context data 116 to dynamically generate a contact address 120. The contact address 120 may be a phone number, a chat address, an email address, or another type of address that routes a user communication to an appropriate technical specialist based on the context data 116, without asking a user to provide the context information. The context data 116 may include, for example, a platform 122 associated with the computing device 102, central processing unit (CPU) data 124 associated with the computing device 102, random access memory (RAM) data 126 and associate with the computing device 102, drive data 128 associated with the computing device 102, data associated with recently installed 132 components (e.g., hardware and software components) associated with the computing device 102, and one or more recent issues 134 associated with the computing device 102. The term "recent" refers to an issue that occurred within a predetermined time interval (e.g., H minutes, hours, or days, where H>0) from a current time. For example, if an operating system has an involuntary restart (or shutdown) within a predetermined time interval (e.g., in the last 5 minutes), then the issue may be a recent issue sufficient to contact technical support.

In some cases, the contact address 120 may be a physical (e.g., "ship to") address to which the user can ship the computing device 102 for repair. For example, in the midst of a pandemic, a user (or a business) may be reluctant to have a repair technician come into their home (or place of business), in case the repair technician is a carrier of a disease. In such situations, the user (or the business) may prefer to ship the computing device 102 to a repair location. The contact address 120 may thus be a physical address where the user ships the computing device 102 for repair.

The platform 122 may indicate whether the computing device 102 is a consumer laptop (e.g., Dell® Inspiron), a business laptop (e.g., Dell® Latitude), a high-end consumer laptop or desktop (e.g., Dell® XPS), a high-end business desktop (e.g., Dell® Vostro), a gaming laptop or desktop (e.g., Dell® Alienware), or another type of platform. The CPU data 124 may indicate a type of CPU, including, for example, a clock speed, a number of cores, a number of caches, a size of each cache, and other CPU related information. The RAM data 126 may include, for example, a number of memory modules, a capacity (e.g., 8 gigabytes (GB), 16 GB, 32 GB, or the like) of each memory module, a speed (e.g., 2800 megahertz (MHz), 3200 MHz, or the like) of each memory module, a type (e.g., DDR2, DDR3, DDR4, or the like) of each memory module, and other memory related information. The drive data 128 may include a number of storage drives associated with the computing device 102, a capacity of each storage drive, a type (e.g., mechanical drive, solid-state drive (SSD), non-volatile memory express (NVME) drive, or the like) of each storage drive, diagnostic information associated with each storage drive, and other drive related information. The peripheral data 130 may indicate information associated with peripherals connected to the computing device 102, such as, for example, one or more display devices (e.g., monitors) connected to the computing device 102, one or more input devices (e.g., keyboard, mouse, trackball, gaming controller, or the like) connected to the computing device 102, a scanner, a printer, or another type of peripheral device connected to the computing device 102. The recently installed 132 may include one or more recently installed software applications of the applications 108, one or more recently installed hardware components (e.g., additional RAM module, additional storage drive, or the like), one or more recently installed peripherals (and their corresponding drivers), another type of recently installed hardware or software component of the computing device 102, or any combination thereof. The recent issues 134 may include one or more of an application crash, an operating system crash, a blue screen of death (BSOD), an involuntary restart, another type of issue or any combination thereof that has occurred within a predetermined period of time (e.g., since a last restore point was created, since a last operating system restart occurred, or another predefined period of time). Thus, the context data 116 may include information about a current configuration of the computing device 102 and the recent issues 134. Based on the context data 116, the address generator 118 may create the contact address 120. The contact address 120 may include information regarding the context data 116 to enable a communication 164 initiated by a user of the computing device 102 to be automatically routed to an appropriate service technician 174, e.g., a service technician that has the experience, and/or education to address the recent issues 134 in the context data 116. In this way, the user is not prompted by an IVR or a chat bot to provide context related information. Instead, the service technician can begin diagnosing the issue and offering suggestions after the user initiates the communication 164. The service technician may provide a response 166 to the user-initiated communication 164 to create a communication session 168. For example, the communication session 168 may be a call (e.g., voice call or video call), a chat session (e.g., chat via an instant messaging application), or an exchange of one or more emails.

In some cases, the computing device 102 may periodically (e.g., at a predetermined time interval, such as N hours, N>0) or in response to a predetermined set of events occurring within a predetermined time period (e.g., X operating system restarts within Y minutes, X application crashes within Y minutes, X logs generated within Y minutes, or the like), send data 170 (e.g., also referred to as telemetry data) to the server 104. For example, the data 170 may include usage data 110, the logs 112, and the device identifier 114. The server 104 may associate the usage data 110 and the logs 112 with the device identifier 114 and store the usage data 110 and the logs 112 in a database. In this way, a service technician can access previously sent data from each of the multiple computing devices, such as the representative computing device 102. In addition, when the computing device 102 determines that an issue has occurred sufficient to contact technical support, in addition to generating the contact address 120 based on the context data 116, the computing device 102 may gather the data 170 (e.g., including the context data 116) and send the data 170 to the server 104 or upload the data 170 to a cloud-based customer relationship management (CRM) 176.

The server 104 may receive the data 170 from each of the multiple computing devices, such as the representative computing device 102, associate the data 170 with a device identifier of the corresponding computing device that sent the data 170, and store the data and the device identifier in a database. For example, the server 104 may store a device identifier 136(1) to a device identifier 136(N) (where N>0, N represents the number of computing devices 102). To illustrate, the device identifier 114 associated with the computing device 102 may be stored as one of the device identifiers 136. The server 104 may associate data 138(1) with the device identifier 136(1) and data 138(N) with the device identifier 136(N). The data 138(N) may include historical data 140 (e.g., the data 170 that is periodically sent by the computing device 102 to the server 104), historical service requests 142 (e.g., service requests to service the computing device associated with the device identifier 136(N)), warranty data 140 for identifying a type of warranty, customer data 146 identifying customer information (e.g., indicating whether the user is a consumer, part of a small business, part of an enterprise, or the like), and previous addresses 148 that were generated by the address generator of the computing device identified by the device identifier 136(N). For example, if the user initially encounters an issue and the address generator 118 generates the contract address 120, then the contact address 120 may be stored as one of the previous addresses 148. If the user encounters the same issue (or a different issue), the user may dial the previously generated contact address 120 and be routed to the same support technician as before. This may enable the support technician to quickly address the issue because the support technician is already familiar with both the context data 116 of the computing device 102.

The server 104 may host or have access to a support site 150 (e.g., Dell.com/support) and may be able to access a browsing history 150 to of a user of the computing device 102. For example, if the computing device 102 has an issue that renders the computing device 102 inoperable, the user may use a device (e.g., smartphone, tablet, or the like) to browse the support site 150 to find a solution to the issue. The user may initiate the communication session 168 using the contact address 120. The server 104 may determine that the device used to initiate the communication session 168 is associated with the user of the computing device 102 and access the browsing history 150 of the user. The browsing history 152 may be used with the context data 116 and the contact address 120 to route the communication 164 to an appropriate service technician.

The server 104 may include a chat bot 154 to ask questions when a user initiates the communication session 168 with a general technical support address. The server 104 may include an IVR system 156 to ask questions when a user initiates the communication session 168 with a general technical support number.

The server 104 may include one or more machine learning 158. Each of the machine learning 158 may be a machine learning algorithm and may include one or more of types of supervised learning, such as, for example, Support Vector Machines (SVM), linear regression, logistic regression, naive Bayes, linear discriminant analysis, decision trees, k-nearest neighbor algorithm, Neural Networks such as Multilayer perceptron or similarity learning, or the like. The machine learning 158 may retrieve the data 170 uploaded to the CRM 176 and determine one or more recommendations 162 based at least in part on the data 170, the historical data 140, the historical service request 142, and the browsing history 152. For example, the recommendations 162 may be provided to the technician 174 to enable the technician 174 to immediately begin addressing the issue that the user has with the computing device 102. The recommendations 162 may include rolling back (e.g., uninstalling) recently installed software (e.g., operating system, application, driver, or firmware), installing an additional software update (e.g., an application that was recently updated may use an updated driver or an updated application that is not currently installed, or the like), or other remedial action.

The server 104 may include a routing module 162 route the communication 164 to an appropriate technician, such as the technician 174. For example, the contact address 120 may be based on the context data 116. The routing module 162 may determine the appropriate support technician to route the communication 164 based on the contact address. This is explained in more detail in FIG. 2.

The technician 174 may use a console 172 to access the data 170 that was uploaded to the CRM 176 and the data 138. The console 172 may be used to display the recommendations 162 provided by the machine learning 158.

The address generator 118 may be stored in a low-level portion of the computing device 102, such as a firmware or a BIOS of the computing device 102. In this way the address generator 118 is capable of generating the contact address 120 even if the computing device 102 is incapable of booting. For example, if the motherboard of the computing device 102 has an issue, the address generator 118 may still be able to create the contact address 120. In some cases, a first portion of the address generator 118 may be stored at a low-level, such as in a firmware or a BIOS of the computing device 102, and a second portion of the address generator 118 may be stored at a higher level, e.g., at a boot or on a recovery volume (e.g., a location that can be accessed before the operating system boots). In this way, the address generator 118 may be capable of generating the contact address 120 even if the operating system cannot boot.

Thus, when an issue arises with the computing device 102 that is of sufficient severity to contact technical support, the computing device 102 may automatically (e.g., without human interaction) gather the context data 116 associated with the issue and generate the contact address 120. The computing device 102 may automatically upload the context data 116 and/or the data 170 to the server 104 or to the CRM 176. The user may initiate the communication 164 (e.g., an audio or video call, chat, or emails) to technical support using the contact address 120. The server 104 may receive the communication 164 and route the communication 164 to an appropriate technician, e.g., the technician 174, based on the contact address 120. The server 104 may automatically access or download the context data 116 and/or the data 170 from the CRM 176 and display the context data 116 and/or the data 170 to the technician 174. The server 104 may use the machine learning 158 to analyze the context data 116, and/or the data 170, the browsing history 150 to (if available), the historical data 140 and the historical service request 142 to provide one or more recommendations 162 to address the issue. The server 104 may display the recommendations 162 to the technician 174. In this way, after the user initiates the communication 164 with the technician 174, the technician 174 can provide the response 166 that includes information indicating that the technician 174 understands the issue and one or more of the recommendations 162 to address the issue. By doing so, the user is not asked to provide the context data 116 by answering questions from the chat bot 154 or the IVR system 156, improving the customer's experience and satisfaction. In addition, the technician 174 is able to not only indicate that the technician 174 understands the issue but also provide one or more of the recommendations 162 to address the issue, enabling the issue to be resolved faster, further improving the customer's experience and satisfaction.

Figure 2:
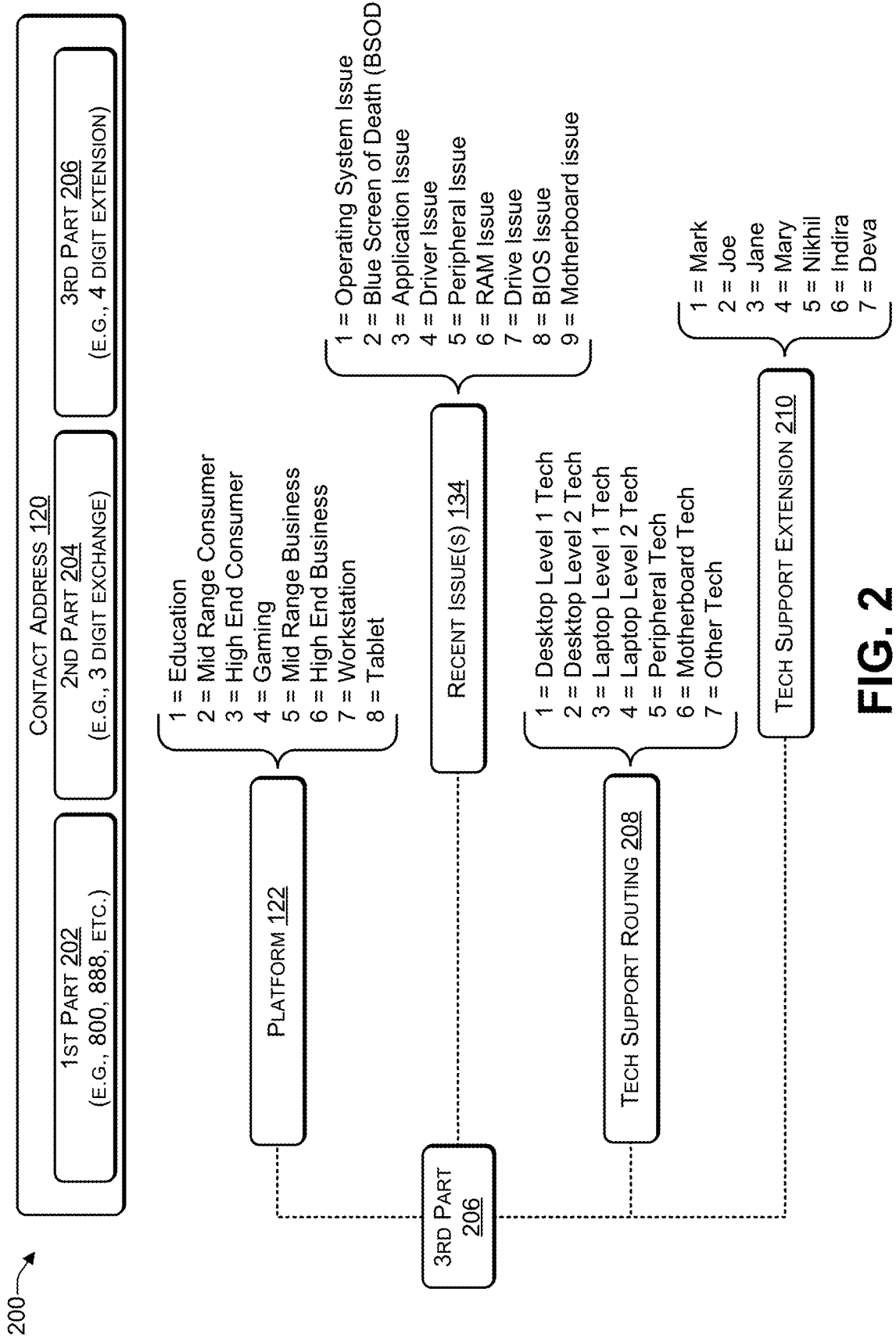
FIG. 2 is a block diagram illustrating components of a dynamically generated contact address, according to some embodiments.

FIG. 2 is a block diagram 200 illustrating components of a dynamically generated contact number, according to some embodiments. For example, if the contact address 120 is a phone number, the contact address 120 may include a first part 202, a second part 204, and the third part 206. The first part 202 may indicate a toll-free number, such as 800, 888, 877, 866, or the like. The second part 204 may be three digits that identify a particular telephone exchange.

The third part 206 may be a four-digit extension to the exchange that provides at least a portion of the routing of the call to the contact address 120. The four-digit extension in the third part 206 may provide information about the context data 116.

For example, one of the digits in the third part 206 may include the platform 122. For example, 1 may indicate an educational platform, 2 may indicate a midrange consumer platform (e.g., Dell® Inspiron), 3 may indicate a high-end consumer platform (e.g., Dell® XPS), 4 may indicate a gaming platform (e.g., Dell® Alienware), 5 may indicate a midrange business platform (e.g., Dell®0 Vostro), 6 may indicate a high-end business platform (e.g., Dell® Latitude), 7 may indicate a workstation platform (e.g., Dell® Precision), 8 may indicate a tablet, and so on.

Another of the digits in the third part 206 may identify a recent issue 134 associated with the computing device 102. For example, 1 may indicate an operating system issue, 2 may indicate a blue screen of death (BSOD), 3 may indicate an application issue, 4 may indicate a driver issue, 5 may indicate a peripheral issue, 6 may indicate a RAM issue, 7 may indicate a storage drive issue, 8 may indicate a BIOS issue, and 9 may indicate a motherboard issue.

Yet another of the digits in the third part 206 may provide a technical support routing 208 (e.g., routing to a particular department). For example, 1 may route to a desktop level 1 technician, 2 may route to a desktop level 2 technician, 3 may route to a laptop level 1 technician, 4 may route to a laptop level 2 technician, 5 may route to a peripheral technician, 6 may route to a motherboard technician, and 7 may route to another type of technician.

Another of the digits in the third part 206 may provide a technical support specialist extension 210 (e.g., a particular individual in a particular department). For example, 1 may route to a first person (e.g., named Mark), 2 may route to a second person (e.g., named Joe), 3 may route to a third person (e.g., named Jane), and so on.

Thus, the contact address 120 may be routed to a particular technician that is familiar with the platform 122 and the recent issue 134. In this way, the user is not asked to answer multiple questions by a chat bot or an IVR system prior to routing the user's call. Instead, the context data 116 of FIG. 1 is used to generate the contact address 120 which is used to route the user communication to a technician who is familiar with the platform and the issue.

While the example in FIG. 2 uses a phone number, similar principles may be applied to generate a universal resource locator (URL) to set up other types of communications with a particular technician. For example, if the contact address 120 comprises <website>/<particular platform>/<particular issue> then the user may be connected with a technician in a department familiar with the particular platform and the particular issue at the website (e.g., Dell.com/support). The contact address 120 may enable a user to initiate an audio communication (e.g., using voice over internet protocol (VoIP)), video communication (e.g., Skype®, Facetime®, Zoom®, or the like), a chat session (e.g., exchange of chat messages), or the like while automatically routing the call to the appropriate technician, e.g., someone familiar with the issue on the platform associated with the computing device.

In addition, the example of FIG. 2 may also be used to generate a physical address, e.g., a "ship to" address where a user can send the computing device 102 of FIG. 1 for repair. For example, the 3rd part 206 may be used as a 4-digit department number that is used to physically route the computing device 102. For example, assume the 3rd part 206 is the number 4224, e.g., indicating that the computing device 102 is a gaming machine with a BSOD issue that is to be routed to a desktop level 2 tech named Mary. The contact address 120, in the form of a "ship to" address may be:

Repairs, Mail Stop No. 4224, 1234 Main St., Somewhere, USA

In this example, the 3rd part 206 may be used as a mail stop (or a department number or other internal routing number) that is used to physically route the computing device 102 after delivery of the computing device 102 to the main address (e.g., 1234 Main. St.).

Because the contact address 120 is dynamically generated and because the technician 172 can remotely connect to the computing device 102, the service technician 172 may modify the address generator 118, e.g., to update the address generator, repurpose numbers, and the like. In addition, in some cases, a first repair address may be associated with addressing a first type of issue (e.g., firmware), a second repair address may be associated with addressing a second type of issue (e.g., motherboard), a third repair address may be associated with addressing a third type of issue (e.g., display device), and so on.

Figure 3:
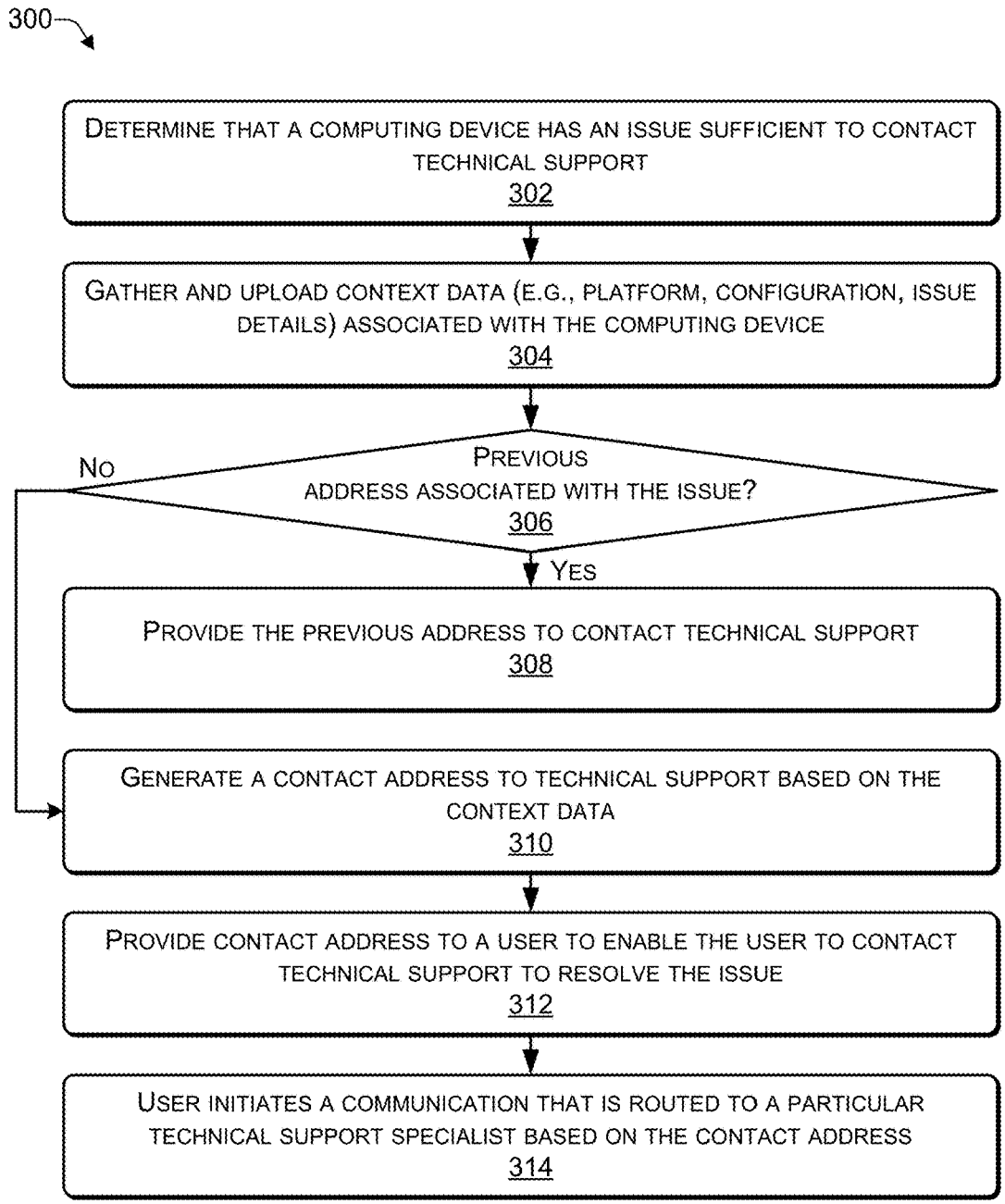
FIG. 3 is a flowchart of a process that includes generating a contact address for technical support, according to some embodiments.
Figure 4:
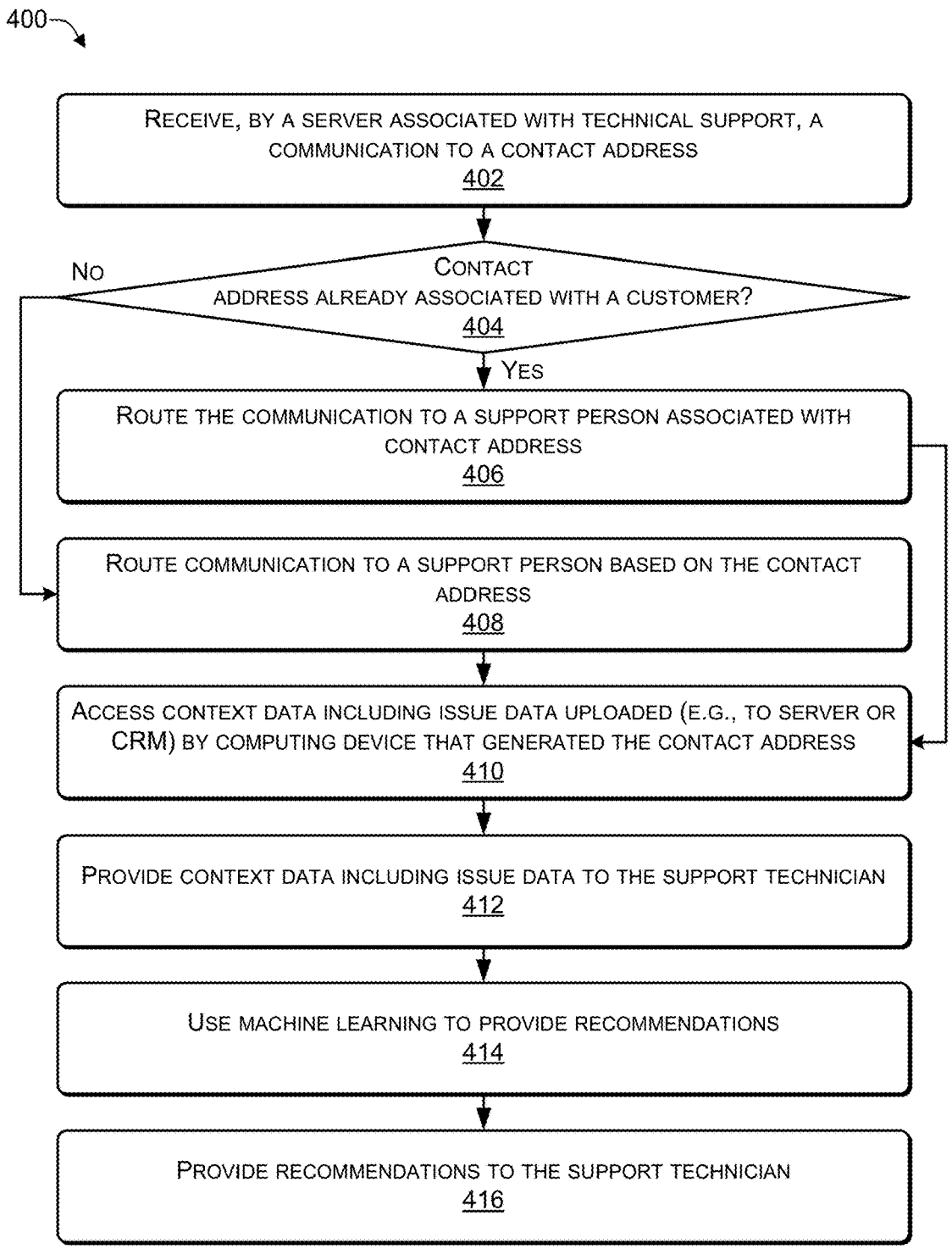
FIG. 4 is a flowchart of a process that includes receiving a communication to a contact address for technical support, according to some embodiments.
Figure 5:
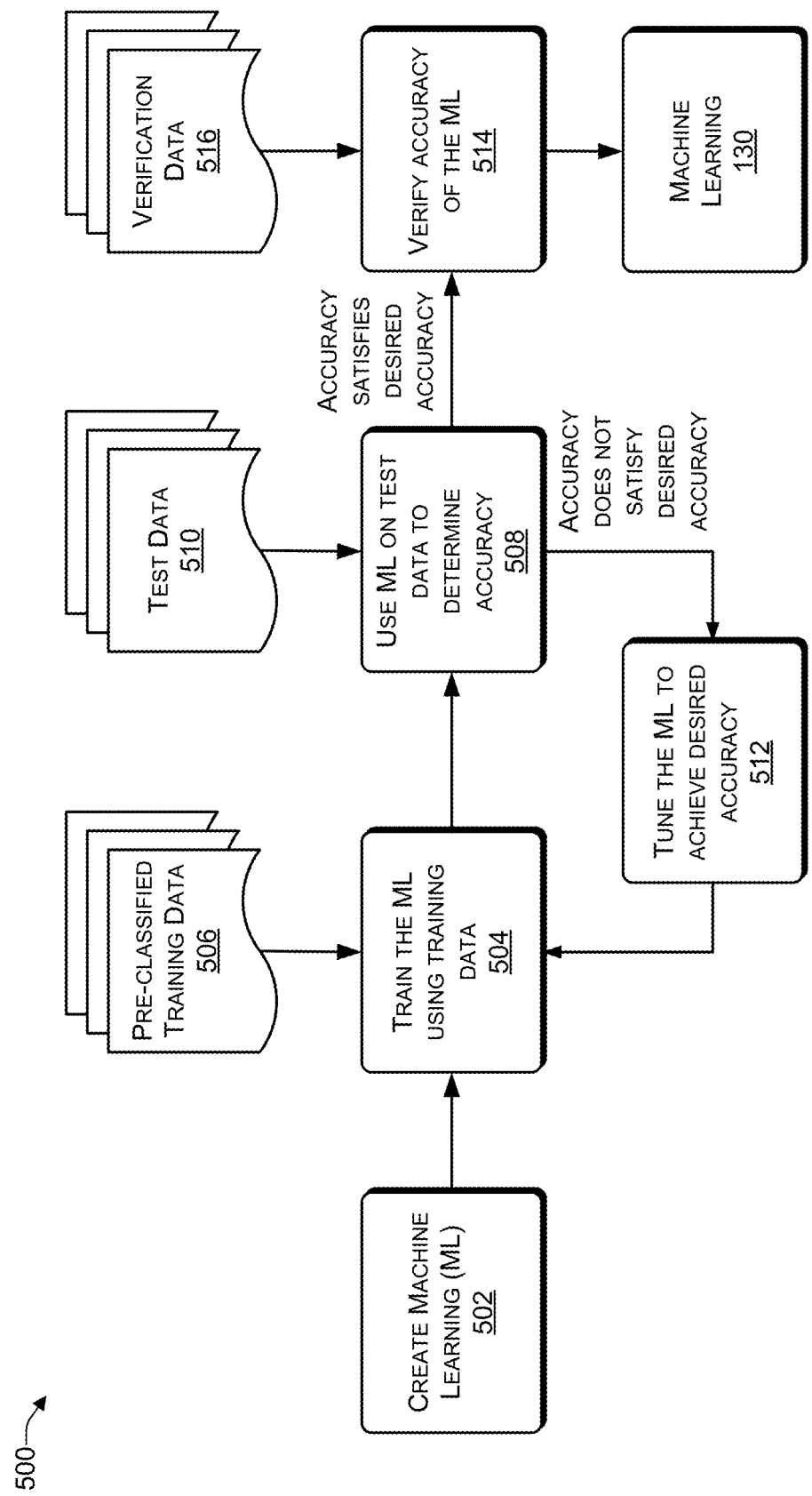
FIG. 5 is a flowchart of a process to train a machine learning algorithm, according to some embodiments.

In the flow diagrams of FIGS. 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, and 500 are described with reference to FIGS. 1 and 2 as described above, although other models, frameworks, systems and environments may be used to implement this process.

FIG. 3 is a flowchart of a process 300 that includes generating a contact address for technical support, according to some embodiments. The process 300 may be performed by one or more components of a computing device, such as the representative computing device 102 of FIG. 1.

At 302, the process may determine that a computing device has an issue sufficient to contact technical support. At 304, the process may gather and upload context data (e.g., platform, configuration, issue details, and the like) associated with the issue to a server (or to a cloud-based CRM system that is accessible to the server). For example, in FIG. 1, the computing device 102 may determine that the computing device 102 has an issue sufficient to warrant contacting technical support. The computing device 102 may gather the context data 116 and upload the context data to the server 104 or to the CRM 176.

At 306, the process may determine whether a previous address was associated with the issue. If the process determines, at 306, that "yes", a previous address was associated with the issue, then the process may proceed to 308 and provide the previous address to contact technical support to a user of the computing device. If the process determines, at 306 that "no" a previous address was not associated with the issue, then the process may proceed to 310. For example, in FIG. 1, if the computing device 102 determines that a previously generated contact address 120 is associated with the recent issue 134, then the computing device 102 may provide the previously generated contact address 120 two the user. If the computing device 102 determines that a previously generated contact address is not associated with the recent issue 134, then the computing device may 102 may generate and provide the new contact address 120 to the user.

At 310, the process may dynamically generate, based on the context data, a contact address (e.g., phone number, video or audio conference URL, chat URL, or email address) to contact (e.g., initiate a communication with) technical support. At 312, the process may provide the contact address to a user to enable the user to contact technical support to resolve the issue. At 314, the user may initiate a communication that is routed to a particular technical support specialist based on the contact address. For example, in FIG. 1, the process may generate the contact address 120 based on the context data 116. An example of the contact address is illustrated in FIG. 2. After the user initiates the communication 164, the communication 164 may be routed by the routing module 160 to the technician 174 based on the technician 174 having experience and/or education regarding the platform 122 and the issue 134.

Thus, when an issue arises on a computing device, the computing device may gather and upload context data associated with the issue to a server or a cloud-based CRM system. If the same (or similar) issue has previously arisen, a contact address associated with the issue may be provided to the user. If the issue has not previously arisen, a new contact address may be dynamically created based on context data associated with the issue and provided to the user. The user may initiate a communication using the contact address. The server may receive the communication and automatically route the communication based on the contact address to a technician that is experienced with resolving the issue (or similar issues) on the platform (or similar platforms).

FIG. 4 is a flowchart of a process 400 that includes receiving a communication to a contact address for technical support, according to some embodiments. The process 400 may be performed by a server, such as the server 104 of FIG. 1.

At 402, a server associated with technical support may receive a communication address to a contact address from a user. At 404, the process may determine whether the contact address is already associated with a customer. If the process determines, at 404 that "yes" the contact address is already associated with a customer, then the process may proceed to 406 where the communication is routed to a support person associated with the contact address, and the process proceeds to 410. If the process determines at 404 that know the contact address is not currently associated with the customer, then the process may proceed to 408 where the communication is routed to a support person based on the contact address. For example, in FIG. 1, the server 104 may receive the communication 164 to the contact address 120. The server 104 may determine whether the contact address 120 is already associated with a customer. For example, the server 104 may determine whether the contact address 120 matches any of the previous addresses 148 associated with the device identifiers 136. If the server 104 determines that the contact address 120 is already associated with the customer, then the communication 164 may be routed to a technician that previously worked with the customer. If the server 104 determines that the contact address 120 is not currently associated with any customer, then the communication 164 may be routed to a particular technician, such as a technician 174, based on the contact address 120.

The contact address associated with a particular customer may be aged or reused based on one or more rules, such as aging or re-association. For example, if a contact address has not been used for more than a particular amount of time, then the contact address may be reused (e.g., due to age) by disassociating the contact address from the particular customer. As another example, if a user has contacted customer support using a second contact address, then a first contact address that was previously used to contact customer support may be disassociated with the particular customer.

At 410, the process may access context data including issue data uploaded to a server or a cloud-based CRM by a computing device that generated the contact address. At 412, the process may provide context data including issue data to the support technician. For example, in FIG. 1, the server 104 may access the context data 116 sent to the server 104 (or uploaded to the cloud-based CRM 176) and provide the context data 116 to the technician 174 to which the communication 164 is routed (e.g., based on the contact address 120). For example, in FIG. 1, the server 104 may access the context data 116 uploaded to the server 104 (or to the cloud-based CRM 176) and provide the context data 116 to the technician 174.

At 414, the process may use machine learning to provide one or more recommendations to resolve the issue. At 416, the process may provide the recommendations to the support technician. For example, in FIG. 1, the server 104 may use the machine learning 158 to analyze the context data 116, the historical data 140, and the historical service requests 142 to create the recommendations 162. The server 104 may provide the recommendations 162 to the technician 174 to enable the technician 174 to provide the recommendations 162 in the response 166.

Thus, when a server associated with a technical support team receives a communication to a contact address, the server may determine whether the contact address is currently associated with a customer. If the contact address is currently associated with a customer, the communication may be routed to a technician that previously worked with the customer. If the contact address is currently not associated with any customer, then the contact address may be used to route the communication to the technician. For example, if a particular issue is occurring on a particular platform, then the contact address that is generated may indicate that the communication is to be routed to a technician that is experienced with the particular issue occurring on the particular platform. In addition, the server may access context data associated with the issue that the computing device uploaded to the server or to a cloud-based CRM and provide the context data to the technician. The server may use machine learning to evaluate the context data and make recommendations to address the issue. The recommendations may be provided to the technician. In this way, the technician can immediately indicate to the user that the technician has identified the issue and has one or more recommendations on how to address the issue, thereby decreasing the amount of time to resolve the issue and increasing customer satisfaction.

FIG. 5 is a flowchart of a process 500 to train a machine learning algorithm, according to some embodiments. The process 500 may be performed by the server 104 of FIG. 1.

At 502, the machine learning algorithm (e.g., software code) may be created by one or more software designers. At 504, the machine learning algorithm may be trained using pre-classified training data 506. For example, the training data 506 may have been pre-classified by humans, by machine learning, or a combination of both. After the machine learning has been trained using the pre-classified training data 506, the machine learning may be tested, at 508, using test data 510 to determine an accuracy of the machine learning. For example, in the case of a classifier (e.g., support vector machine), the accuracy of the classification may be determined using the test data 510.

If an accuracy of the machine learning does not satisfy a desired accuracy (e.g., 95%, 98%, 99% accurate), at 508, then the machine learning code may be tuned, at 512, to achieve the desired accuracy. For example, at 512, the software designers may modify the machine learning software code to improve the accuracy of the machine learning algorithm. After the machine learning has been tuned, at 512, the machine learning may be retrained, at 504, using the pre-classified training data 506. In this way, 504, 508, 512 may be repeated until the machine learning is able to classify the test data 510 with the desired accuracy.

After determining, at 508, that an accuracy of the machine learning satisfies the desired accuracy, the process may proceed to 514, where verification data for 16 may be used to verify an accuracy of the machine learning. After the accuracy of the machine learning is verified, at 514, the machine learning 130, which has been trained to provide a particular level of accuracy may be used.

The process 500 may be used to train each of one or more machine learning algorithms, such as the machine learning 158 of FIG. 1.

Figure 6:
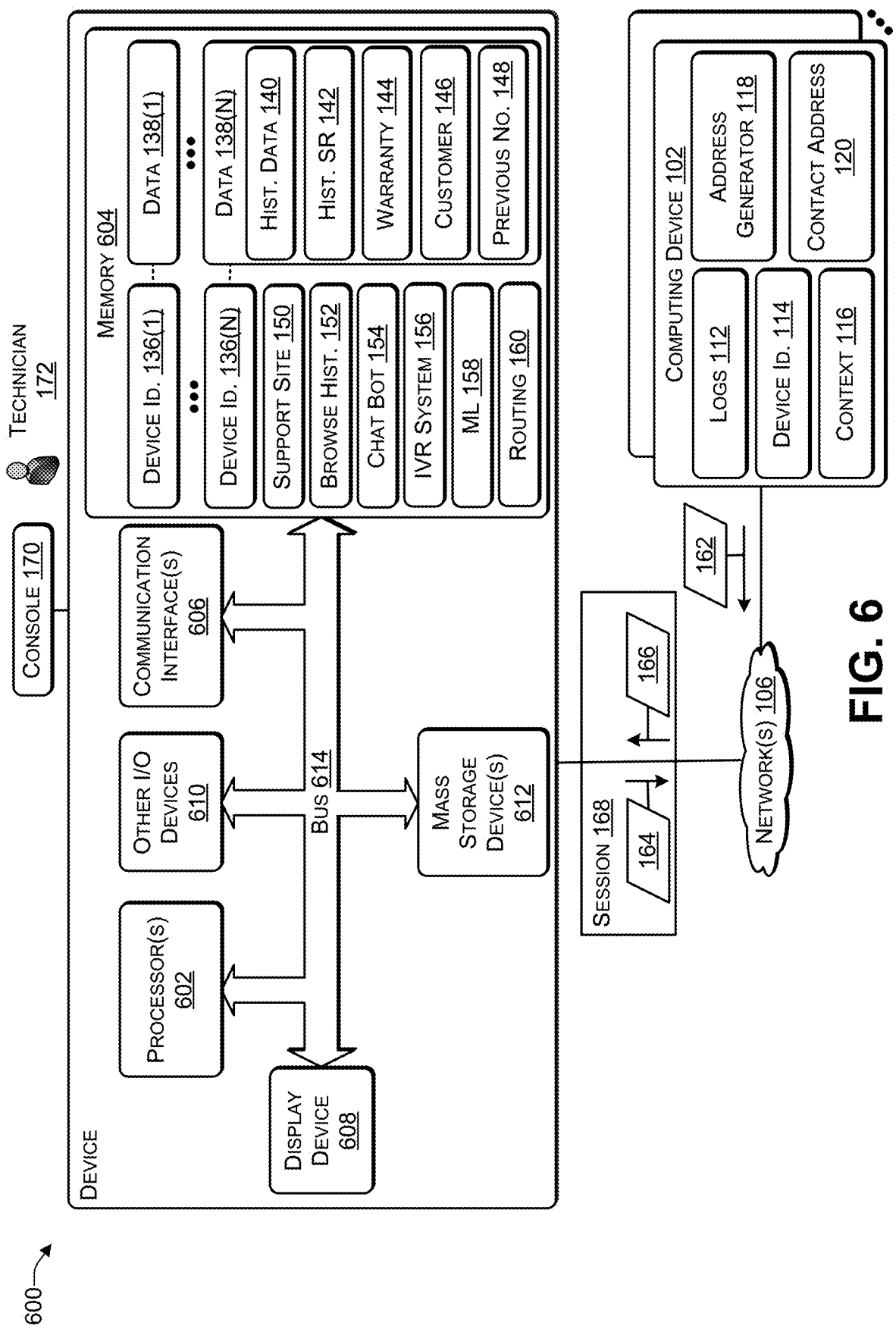
FIG. 6 illustrates an example configuration of a computing device that can be used to implement the systems and techniques described herein.

FIG. 6 illustrates an example configuration of a device 600 that can be used to implement the systems and techniques described herein, such as for example, the computing devices 102 and/or the server 104 of FIG. 1. As an example, the device 600 is illustrated in FIG. 6 as implementing the server 104 of FIG. 1.

The device 600 may include one or more processors 602 (e.g., CPU, GPU, or the like), a memory 604, communication interfaces 606, a display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The device 600 may include one or more communication interfaces 606 for exchanging data via the network 110. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 116 and mass storage devices 612, may be used to store software and data. For example, the computer storage media may be used to store the data 138 associated with a corresponding device identifier 136, the machine learning 158, and the like.

A computer manufacturer (e.g., Dell®) may provide service technicians, such as the representative technician 174, to resolve issues related to devices sold by the computer manufacturer. For example, after a user has purchased the computing device 102, the user may encounter an issue, such as a hardware issue, a software issue, or both. The computing device 102 may gather the context data 116 and dynamically generate the contact address 120 (e.g., a dynamically generated phone number or dynamically generated web address or email address), to enable the user to contact technical support. Rather than being routed to an IVR system or a chat bot, the dynamically generated contact address 120 may directly route the user-initiated communication 164 (e.g., call or chat) to the technician 174 that is skilled in resolving such issues.

After an issue occurs that is sufficient (e.g., application crash, operating system (OS) crash, blue screen of death (BSOD), hard disk crash, or the like) to warrant contacting customer support, the computing device 102 may gather the context data 116, such as, for example, the platform 122 (e.g., tablet, laptop, desktop, consumer, business, gaming, or the like) associated with the computing device 102, CPU data 124 associated with a central processing unit (CPU) of the computing device 102, random-access memory (RAM) data associated with a memory of the computing device 102, drive data associated with one or more storage devices of the computing device 102, peripheral data associated with one or more peripherals connected to the computing device 102, one or more recent issues 134 (e.g., application crash, OS crash, BSOD, or the like) associated with the computing device 102, including logs 112 associated with the recent issues, or any combination thereof. The computing device 102 may use the context data 116 to dynamically generate the contact address 120, such as a contact number (e.g., to call), a contact web address (e.g., to chat), a contact email address (e.g., to email), or the like. The user may use the contact address 120 to initiate the communication 164 with technical support. The contact address 120 that was dynamically generated may route the user communication 164 directly to the customer service technician 174 that is suited (e.g., has the training and/or experience) to address the issue 134.

When the server 104 receives the communication 164 initiated through a dynamically generated contact address 120, the server 104 may analyze the contact address 120 to determine the context information (e.g., laptop, desktop, consumer, business, enterprise, operating system, application, and the like) and use machine learning 158 to determine the recommendations 162. The contact address 120 may be automatically routed to an appropriate service technician that has skills, education, and experience with the issue (or similar issues). In this way, the user is not asked to answer multiple IVR (or chat bot) questions.

In addition to generating the contact address 120, the computing device 102 may automatically upload the context data 116 to the server 104 or the cloud-based customer relationship manager (CRM) 176. After the server 104 receives the communication 164 and routes the communication 164 to the appropriate service technician 174, the server 104 may retrieve the uploaded context data 116 and provide the context data 116 to the service technician 174. In this way, the service technician 174 can view the context data 116 as the user is being placed in communication with the service technician 116, thereby enabling the service technician 174 to immediately begin troubleshooting the issue 134. In some cases, machine learning 158 may be used to identify and prioritize a set of recommendations 162 to address the issue 134 and the prioritized set of recommendations 162 may be presented to the service technician 174 along with the context data 116. Thus, the service technician 174 is presented not only with context data 116 associated with the issue 134 but also a prioritized set of recommendations 162 (e.g., possible solutions to the issue 134), enabling the service technician 174 to quickly and efficiently address the issue 134. Doing so may improve customer satisfaction and improve the efficiency of each service technician.

Figure 7:
FIG. 7 is a block diagram illustrating components of a dynamically generated universal resource locator (URL), according to some embodiments.

FIG. 7 is a block diagram 700 illustrating components of a dynamically generated universal resource locator (URL), according to some embodiments. FIG. 7 illustrates an example in which the contact address 120 comprises a URL. For example, a first part 702 may be a manufacturer site (e.g., dell.com), a second part 704 may be a support site portion (e.g., dell.com/support) of the manufacturer site, a third part 706 may indicate a device type (e.g., laptop) of the computing device 102 of FIG. 1, a fourth part 708 may indicate a type of platform (e.g., XPS) of the computing device 102, and a fifth part 710 may indicate an issue (e.g., BSOD) of the computing device 102. Thus, in this example, the URL that is generated as the contact address 120 may be: www.dell.com/support/laptop/xps/bsod Navigating to the contact address 120 may cause the user to initiate a video call (e.g., using Zoom®, Skype®, Facetime®, or the like), an audio call (e.g., VoIP), a chat session (e.g., using Zendesk® or similar platform), or another type of communication session with a particular technician who is experienced with the device type, the platform, and the issue that the user is having.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement pre-scribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
   determining, by a computing device, that an issue has occurred on the computing device;
   determining, by the computing device, context data associated with the issue, the context data comprising:
   one or more logs generated by a component of the computing device; and
   platform data identifying a type of platform associated with the computing device;
   determining, by the computing device, that the issue has not previously occurred on the computing device; and
   generating, by the computing device and based at least in part on the context data, a contact address provided to a user of the computer device, enabling the user to initiate contact with technical support, wherein the contact address comprises digits identifying an individual technical support specialist and contact information associated with the individual technical support specialist, wherein the contact address comprises a first digit that identifies the platform data, a second digit that identifies the issue, a third digit that identifies a type of technical support specialist, and a fourth digit that identifies the individual technical support specialist, and wherein an order of the first digit, second digit, third digit and forth digit may vary;
   wherein a communication initiated using the contact address causes the communication to be automatically routed to the individual support technician using the contact information associated with the individual technical support specialist, the individual technical support specialist having experience with the issue on the type of platform associated with the computing device, wherein the contact address is analyzed to identify the individual support technician having experience with the issue.

2. The computer-implemented method of claim 1, wherein the issue comprises at least one of:
   a failure to boot an operating system of the computing device;
   an involuntary shutdown of the operating system;
   an involuntary reboot of the operating system;
   an inability to execute a software application; or
   an inability to execute a driver.

3. The computer-implemented method of claim 1, wherein the context data further comprises at least one of:
   CPU data associated with a central processing unit (CPU) of the computing device;
   RAM data associated with a random-access memory (RAM) of the computing device;
   drive data associated with a storage drive of the computing device; or
   peripheral data associated with a peripheral device that is connected to the computing device.

4. The computer-implemented method of claim 1, wherein the context data further comprises recently installed data associated with a component of the computing device that was installed within a predetermined time interval from a current time, the component of the computing device comprising at least one of:
   an operating system or an update to the operating system;
   a software application or an update to the software application;
   a driver;
   a firmware; or
   a basic input/output system (BIOS).

5. The computer-implemented method of claim 1, wherein the contact address comprises one of:
   a telephone number to initiate a telephone communication;
   a video link to initiate a video communication;
   an audio link to initiate an audio communication;
   a chat link to initiate a chat communication; or
   an email address to initiate an email communication.

6. The computer-implemented method of claim 1, further comprising:
   automatically uploading the context data to either a server or a cloud-based customer relationship management (CRM) system to enable the support technician to access the context data.

7. A computing device comprising:
   one or more processors; and
   one or more non-transitory computer readable media storing instructions executable by the one or more processors to perform operations comprising:
   determining that an issue has occurred on the computing device;
   determining context data associated with the issue, the context data comprising:
   one or more logs generated by a component of the computing device; and
   platform data identifying a type of platform associated with the computing device;
   determining that the issue has not previously occurred on the computing device; and
   generating, based at least in part on the context data, a contact address provided to a user of the computer device, enabling the user to initiate contact with technical support, wherein the contact address comprises digits identifying an individual technical support specialist and contact information associated with the individual technical support specialist, wherein the contact address comprises a first digit that identifies the platform data, a second digit that identifies the issue, a third digit that identifies a type of technical support specialist, and a fourth digit that identifies the individual technical support specialist, and wherein an order of the first digit, second digit, third digit and forth digit may vary;
   wherein a communication initiated using the contact address causes the communication to be automatically routed to the individual support technician using the contact information associated with the individual technical support specialist, the individual technical support specialist having experience with the issue on the type of platform associated with the computing device, wherein the contact address is analyzed to identify the individual support technician having experience with the issue.

8. The computing device of claim 7, wherein the issue comprises at least one of:
   a failure to boot an operating system of the computing device;
   an involuntary shutdown of the operating system;
   an involuntary reboot of the operating system;
   an inability to execute a software application; or
   an inability to execute a driver.

9. The computing device of claim 7, wherein the context data further comprises at least one of:
   CPU data associated with a central processing unit (CPU) of the computing device;
   RAM data associated with a random-access memory (RAM) of the computing device;
   drive data associated with a storage drive of the computing device; or
   peripheral data associated with a peripheral device that is connected to the computing device.

10. The computing device of claim 7, wherein the context data further comprises recently installed data associated with a component of the computing device that was installed within a predetermined time interval from a current time, the component of the computing device comprising at least one of:
    an operating system or an update to the operating system;
    a software application or an update to the software application;
    a driver;
    a firmware; or
    a basic input/output system (BIOS).

11. The computing device of claim 7, wherein the contact address comprises one of:
    a telephone number to initiate a telephone communication;
    a video link to initiate a video communication;
    an audio link to initiate an audio communication;
    a chat link to initiate a chat communication; or
    an email address to initiate an email communication.

* * * * *